United States Patent [19]

Ender, Sr.

[11] Patent Number: 4,471,605
[45] Date of Patent: Sep. 18, 1984

[54] MACHINE FOR INVERTING WINDROWS

[76] Inventor: Herman R. Ender, Sr., 29516 S. Bird Rd., Tracy, Calif. 95376

[21] Appl. No.: 456,873

[22] Filed: Jan. 10, 1983

[51] Int. Cl.³ ............................................. A01D 79/00
[52] U.S. Cl. ........................................ 56/372; 171/101
[58] Field of Search ......................... 56/372, 364, 396; 171/101, 61, 62

[56] References Cited

U.S. PATENT DOCUMENTS

| | | | |
|---|---|---|---|
| 3,141,284 | 7/1964 | Reynolds | 56/372 |
| 3,173,238 | 3/1965 | Smith | 56/372 |
| 4,022,005 | 5/1977 | Case | 56/372 |
| 4,230,188 | 10/1980 | Paulk | 171/101 |

Primary Examiner—Jay N. Eskovitz
Attorney, Agent, or Firm—Lothrop & West

[57] ABSTRACT

A machine advances along a windrow of hay, or other field crop, which is dry on top but still damp on the bottom. The windrow is engaged, elevated and urged rearwardly in a continuous stream. A diagonal deflector adjacent the after end of the machine intercepts the flow of the windrow and inverts it before returning the inverted windrow to the ground. Twin spaced rows of disappearing backwardly raked tines travel across the face of the deflector in the path of the windrow to assure inversion; and guide rods at the trailing end of the deflector smoothly direct the windrow as it gravitates to the ground. The damp side of the windrow is thereby exposed to the drying effects of sun and wind.

9 Claims, 6 Drawing Figures

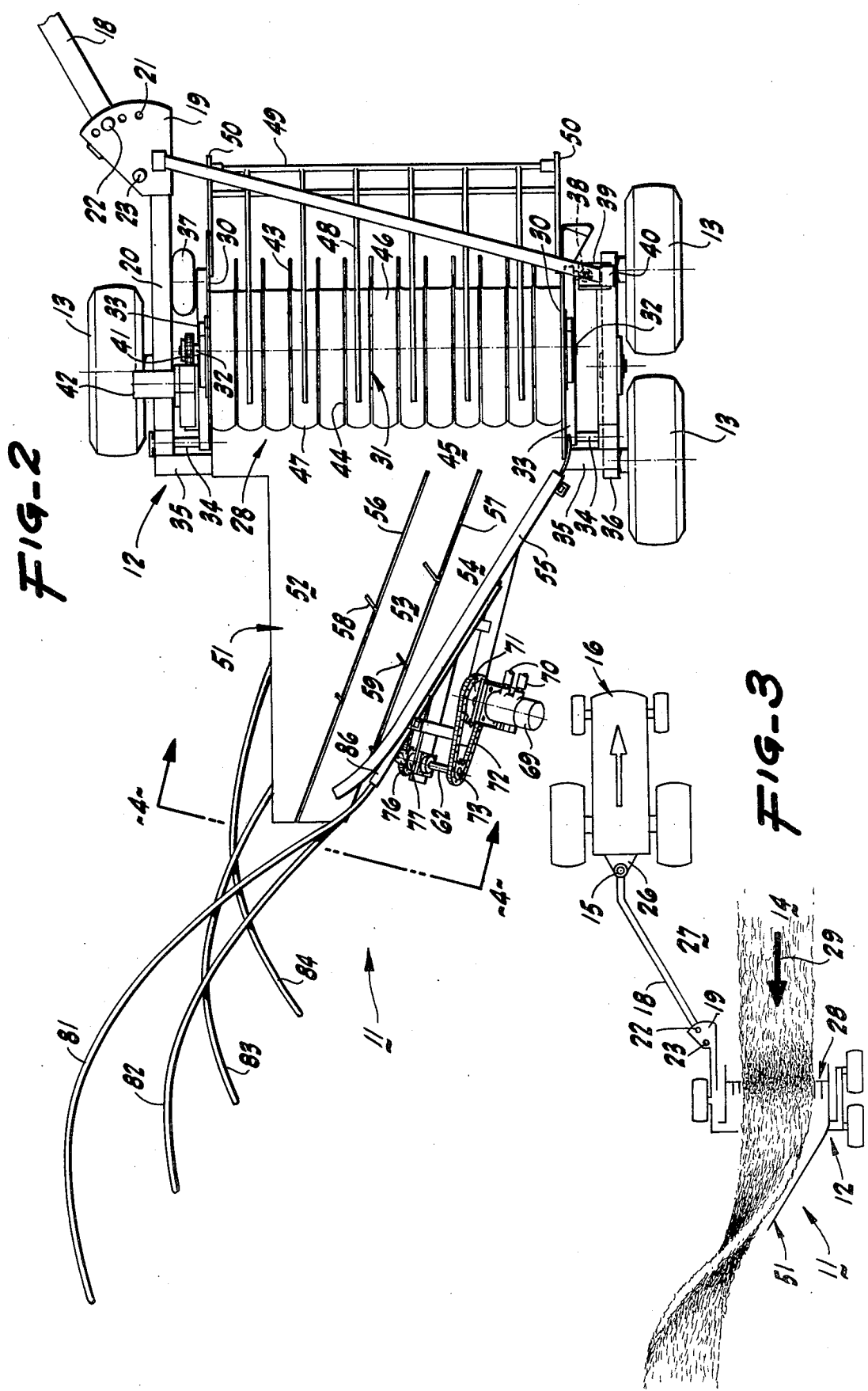

MACHINE FOR INVERTING WINDROWS

BACKGROUND OF THE INVENTION

The market place as well as the patent literature are not without examples of apparatus capable of continuously engaging and lifting a window of hay, or the like, turning over the windrow and redepositing it on the ground to expose the surface previously adjacent the ground to the drying effects of the sun and wind.

Exemplary is the machine shown and described in U.S. Pat. No. 3,714,766 dated Feb. 6, 1973 to Ender et al entitled Machine For Combining Hay Windrows.

Another machine designed primarily for inverting individual windrows, rather than combining two adjacent windows into a single central windrow as in U.S. Pat. No. 3,714,766, is disclosed in my design patent application, Ser. No. 06/346,802 filed Feb. 5, 1982 for Machine For Inverting A Hay Windrow.

Although the physical embodiment of the latter design operates in a satisfactory manner in connection with inverting windrows of many types of hay and other crops, such as soy beans, bush beans, and the like, it has been found that under certain crop and atmospheric conditions the windows do not emerge from the after end of the advancing machine in a fully inverted position.

There is, in other words, room for improvement in the field of inverting previously cut and partially dry windrows of hay, and other such crops, in order to improve drying.

SUMMARY OF THE INVENTION

It is a major object of the invention to provide a windrow inverting machine which engages and lifts a windrow off the ground and then positively advances the windrow into enggement with and across a curved deflector in order to make sure that the windrow is fully inverted. Positive advance is accomplished by means of linearly moving tines which are fully emergent from the deflector as they first engage the windrow but which then retract as the windrow traverses the deflector and disappear as the inverted windrow reaches the trailing end of the deflector plate and discharges therefrom to descend smoothly to the ground with the help of guide rods, which also help to compress the windrow once it reaches the ground.

BRIEF DESCRIPTION OF THE DRAWING FIGURES

FIG. 2 is a top plan view thereof;

FIG. 3 is a top plan in schematic form, illustrating the path of a windrow being inverted by the machine pulled by a tractor;

DETAILED DESCRIPTION OF A PREFERRED EMBODIMENT

Figure 1:
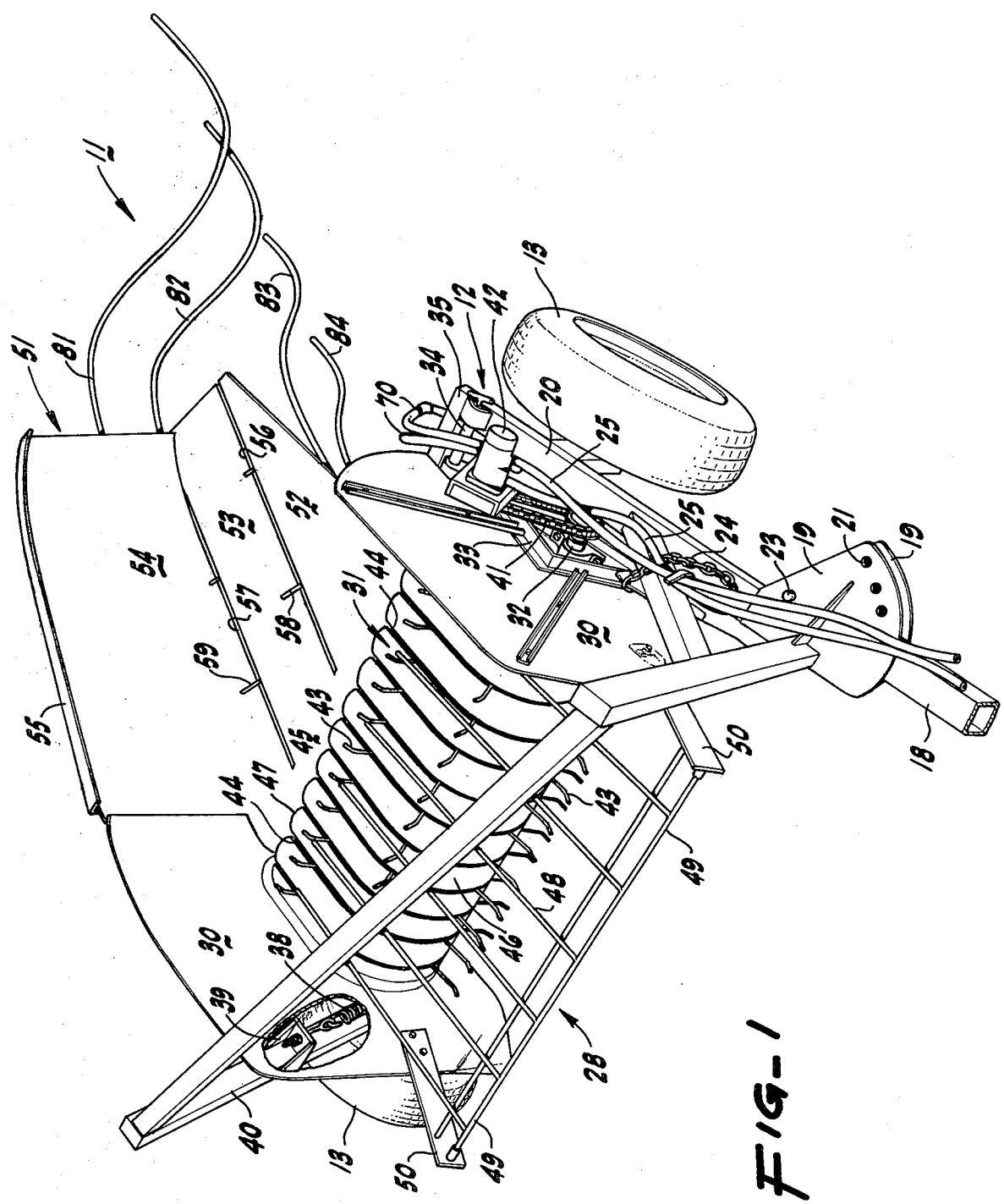
FIG. 1 is a right front perspective from above, the leading end of the draft tongue being broken away to reduce the extent of the figure.

Although the windrow inverter of the invention is susceptible of numerous different physical embodiments, depending upon the environment and requirements of use, the herein shown and described embodiment has been carefully tested under a variety of crop and atmospheric conditions and has performed in an entirely satisfactory manner.

The machine for inverting windrows of the invention, generally designated by the reference numeral 11, includes a mobile main frame 12 supported on ground-engaging wheels 13 for advancing the machine along a windrow 14 of pre-cut field crop material, such as hay, soy beans, bush beans, or the like, where the windrow is mostly dry topside but is still somewhat damp on the bottom. The mobile frame 12 is advanced along the windrow 14 by suitable means, such as a tractor 16, moving ahead in the direction indicated by the arrow 17. The tractor 16 is hitched, in customary fashion, to a draft tongue 18 projecting from the adjacent forward corner of the main frame.

Angular adjustment of the draft tongue 18 is afforded by a vertically spaced pair of sector plates 19 mounted on the forward end of the left-hand fore and aft channel 20 of the frame 12. The plates 19 are provided with a plurality of vertically registering openings 21 to receive a retaining pin 22 passing through a registering opening, not shown, in the draft tongue 18.

In order to position the draft tongue at the desired angle, the retaining pin 22 is removed and the draft tongue is angularly swung about the pivot pin 23 as a center until the proper position is reached, at which time the draft tongue is moved so that the opening in the draft tongue is placed in register with the closest pair of openings 21 in the plates 19 and the retaining pin inserted. The leading end of the draft tongue 18 is ordinarily pivotally connected, as at 15, in FIG. 3, to the tractor's draw bar 26.

As the tractor 16 advances across the field 27, the window inverting machine 11 is located relative to the windrow 14 so that a side-skirted pickup reel unit, generally designated by the reference numeral 28, engages, elevates and moves the windrow in a rearward direction 29 relative to the advancing machine.

The pickup reel unit 28 includes, in addition to an opposed pair of side skirts 30, a pickup reel 31 having a shaft 32 journaled on a sub-frame 33 pivotally mounted on a pair of transverse stub axles 34, or pivot pins, one pin being mounted on the left hand fore and aft channel 20 and the other on a right-hand fore and aft channel 36 of the main frame 12. The transverse horizontal pivot axis of the pickup reel unit 28 is defined by the pins 34, the pins 34 being located just forward of the transverse beam 35 of the main frame 12, as appears most clearly in FIG. 2.

The forward left-hand portion of the pivoted pickup reel unit 28 is supported in part by a small gauge wheel 37 and the forward right hand portion is suitably counterbalanced, as by a vertical tension spring 38 supported from a bracket 39 on the frame post 40 so that as the machine advances along the windrow, the lower leading portions of the side skirts 30 of the pivoted reel unit 28 float along easily, just at or slightly above the ground. A chain 24 limits the downward movement of the unit 28.

The shaft 32 of the pickup reel 31 is rotated by an endless chain 41 driven by a hydraulic motor 42 connected by suitable hydraulic hoses 25 and fittings to a source of hydraulic pressure on the tractor 16 and controlled by the customary controls, not shown.

As appears most clearly in FIG. 1, the pickup reel 31 is provided with a plurality of rows of forwardly raked tines 43 which pass through fore and aft slots 44 in a reel cover 46. The slotted reel cover 46 extends from below the reel 31, curves upwardly over the front of the reel and projects rearwardly and horizontally slightly above the reel, to terminate at an after end 47 located approximately where the tips of the revolving tines 43 disappear as they descend through the slots 44.

Several parallel, substantially horizontal rods 48 are secured at their forward ends to a transverse rod 49 pivotally mounted between a pair of arms 50 projecting forwardly from the side skirts 30. The rods 48 extend rearwardly to overlie the major portion of the substantially horizontal top portion of the slotted cover 46. The rods 48 are spaced closely above the cover 46 and by gravity tend to press down on and compact the windrow material as the windrow is urged rearwardly by the tines 43 over the upper surface of the cover 46 and beneath the rods 48.

As the somewhat compacted, or compressed, windrow 14 emerges from the after end of the slotted reel cover 46 and leaves the tines 43, the windrow is urged still farther rearwardly, being pushed by the approaching mass of windrow material still in engagement with the rearwardly moving tines 43.

The rearwardly moving horizontal stream of windrow material slides from the slotted cover 46 onto a substantially horizontal apron 45 which begins at a location about an inch or two below the after end 47 of the slotted cover 46. The apron 45 extends rearwardly toward a large diagonal deflector 51 which acts upon the windrow to effect inversion thereof as well as lateral displacement and redeposit on the ground.

Since the portion of the somewhat compacted windrow sliding across the apron 45 continues to be moved toward the rear as a result of the very considerable urgency exerted by the tines 43 still in engagement with the oncoming mass of material, the windrow is forcefully pushed against the deflector 51.

The deflector 51 includes a first portion 52, which begins with the apron 45 and extends rearwardly in a converging triangular shape with the left-hand (looking aft) and after portions inclined upwardly. The deflector 51 also includes a moderately inclined second portion 53 and a third portion 54 which slopes at the same inclination as the second portion 52 in its lower region but becomes steeper and is substantially vertical near its top margin 55.

The second portion 53 of the deflector 51 is separated from the first portion 52 by a first narrow linear slot 56. In similar fashion, the second portion 53 is separated from the third portion 54 by a second narrow linear slot 57. The purpose of the slots 56 and 57 will subsequently be described in detail.

The overall diagonal and curvilinear configuration of the collective portions 52, 53 and 54 presents a surface which diagonally deflects and ordinarily overturns the somewhat compacted windrow 14, as most clearly appears in schematic fashion in FIG. 3.

However, for certain types of crops and under various conditions of atmospheric humidity and temperature and crop moisture, the deflector 51 does not reliably invert the windrow 14 without assistance.

Assistance is provided in the present machine by a spaced parallel set of tines 58 and 59, arranged to pass through the linear diagonal slots 56 and 57, respectively. Both the lower set of tines 58 and the upper set of tines 59 project upwardly through the respective slots 56 and 57 for a first portion of the slot length and then diminish in height and disappear in a second portion of the slot length.

More particularly, as appears most clearly in FIGS. 2 and 4-6, each of the sets of tines 58 and 59 is constructed in substantially identical fashion and a description of one will therefore serve to describe the other, with the exceptions noted.

Figure 4:
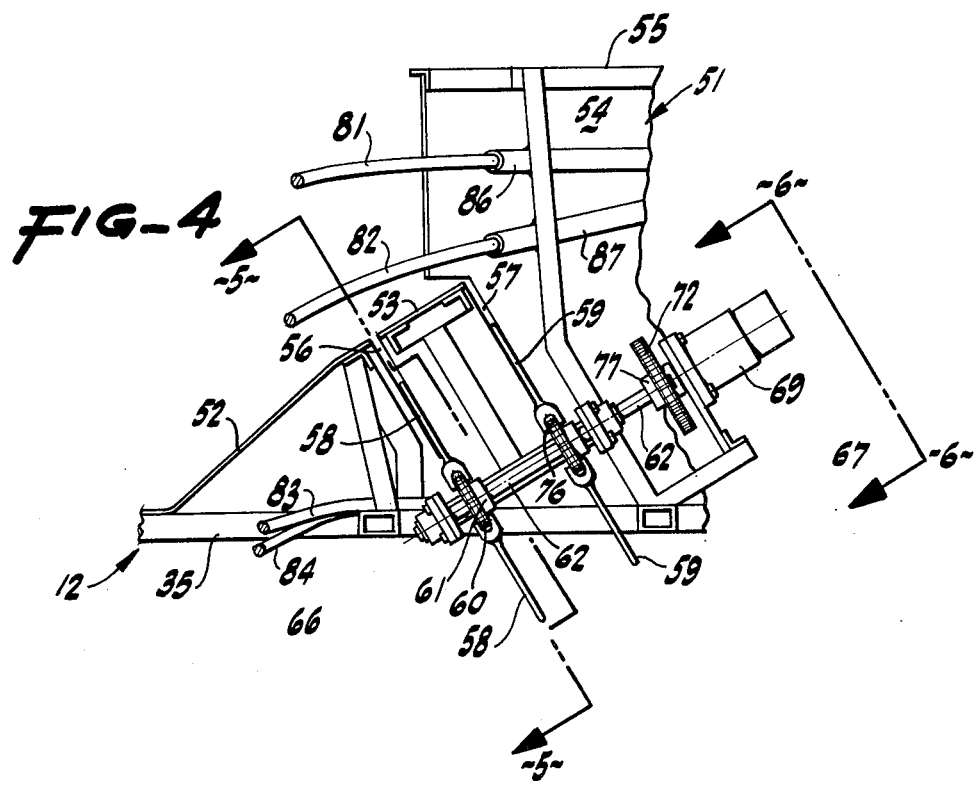
FIG. 4 is a fragmentary elevational view of the tine mechanism, the plane of the view being indicated by the lines 4—4 in FIG. 2.
Figure 5:
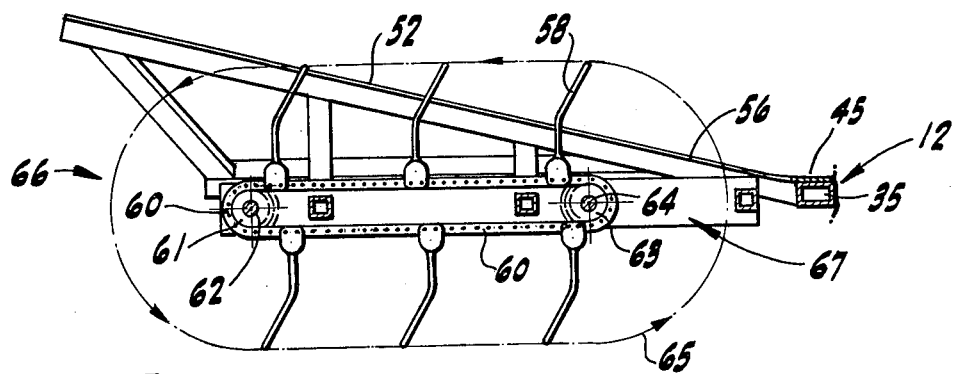
FIG. 5 is a fragmentary sectional view of one of the tine and tine chain mechanisms, taken on the plane indicated by the line 5—5 in FIG. 4; and, FIG. 6 is a fragmentary elevational view of the tine drive structure, the plane of the view being indicated by the line 6—6 in FIG. 4.
Figure 6:
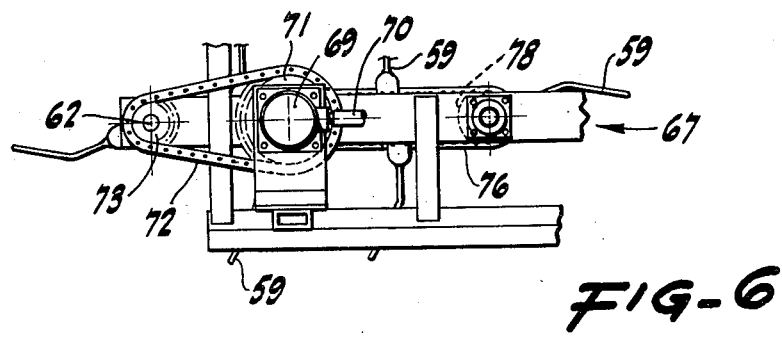

With especial reference to FIGS. 4 and 5, it can be seen that the lower tines 58 are mounted on an endless chain 60 trained over a first sprocket 61 mounted on a shaft 62 and a second sprocket 63 journaled on an axle 64. The tine drive mechanism, generally designated by the reference numeral 66, is mounted on a framework 67 supported on and projecting rearwardly from the cross beam 35 of the main frame 12.

Driving the shaft 62, sprocket 61, endless chain 60 and tines 58 is a hydraulic motor 69 acting through sprocket 71 and endless chain 72 to drive sprocket 73 on shaft 62. Hoses 70 connect motor 69 to a pressure source.

Thus, tines 59 on an endless chain 76 are actuated by motor 69 acting through chain 72, sprocket 73 and shaft 62, on which is mounted a sprocket 77 engaging the chain 76, which is also trained over an idler sprocket 78 journaled on the framework 67.

The tine drive mechanism 66, in other words, serves to advance both lower tines 58 and upper tines 59. These two sets of tines are rearwardly raked so that they smoothly disengage from the windrow at the time they descend through their respective slots 56 and 57 at the end of their diagonal and rearward traverse across the curvilinear face of the deflector.

The disappearing nature of the tines is most clearly illustrated in FIG. 5 which shows the relative slope between the tine framework 67 and the surface of the deflector portion 52.

The backwardly raked lower tines 58 emerge through the slot 56 as they commence their upper run of the course indicated by the direction arrows 65 and quickly assume maximum height as they are impelled into the overlying windrow at the precise location where maximum push on the windrow is needed. After forcefully urging the advancing windrow against the curved deflector 51 and assuring inversion of the windrow, the tines 58 descend or disappear through the slot 56.

In like manner, the upper tines 59 emerge through the slot 57 and quickly assume their maximum height at the beginning of the upper run, and subsequently smoothly disengage from the windrow and disappear through the slot 57 after assuring windrow inversion.

The shape and action of the twin rows of movable tines 58 and 59 is of major importance in the successful operation of the machine. As the tines initially emerge to their maximum height, they engage the windrow and not only urge it forwardly at a critical juncture but the backward rake of the tines appears to provide a slight elevating effect which aids in the inverting action of the deflector 51.

As the inverted windrow 14 emerges from the after end of the deflector 51, the windrow engages a plurality of adjustably positionable guide rods 81, 82, 83 and 84 mounted on the deflector framework. Conveniently, the guide rods are adjustable to length and angular orientation, one end of each rod being located in a tube 86 and 87, for example, and being secured by a set screw, not shown.

The rods not only smoothly direct the inverted windrow as the windrow gravitates toward the ground but they also serve to pack down or somewhat compress the windrow against the underlying stubble or ground to prevent or minimize subsequent dislodgement occasioned by strong winds.

I claim:

1. A machine for inverting windrows comprising:
    a. a frame supported on ground engaging wheels for forward movement along a windrow;
    b. a pickup reel mounted on said frame for engaging, elevating and rearwardly moving the windrow;
    c. a windrow deflector mounted on said frame to the rear of said pickup reel, said deflector including a first portion having a slope varying from substantially horizontal at its forward end to a first upwardly sloping attitude adjacent its after end and a second portion having a more steeply inclined upward slope to engage and then laterally and rearwardly deflect and invert a windrow emerging from said pickup reel;
    d. tine means protruding through a slot in said deflector for engaging the windrow and positively advancing the same along a lateral and rearward path to emerge from said deflector and gravitate to the ground in inverted position; and,
    e. a substantially horizontal apron extending rearwardly from below the after end of said pickup reel and merging with said deflector to support the windrow as it emerges from said pickup reel and advances toward said deflector.

2. A machine as in claim 1 including a plurality of guide rods mounted on said deflector and projecting diagonally and rearwardly therefrom for engaging the windrow emerging from the deflector and directing the windrow toward the ground in inverted position.

3. A machine as in claim 1 in which said tine means includes a pair of sprockets mounted on said frame below and aligned with the slot in said deflector; an endless chain trained around said sprockets; a plurality of tines carried on said chain in alignment with the slot the tines on the upper run of said chain being emergent through the slot for a portion only of said upper run; and means on said frame for driving said sprockets, said chain and said tines for advancing the portion of the windrow engaged by the tines emergent through the slot.

4. A machine as in claim 3 in which there is a pair of tine means in parallel spaced relation.

5. A machine as in claim 4 in which the distal portion of said tines is rearwardly raked with respect to the direction of movement of said chains and said tines.

6. A machine as in claim 1 in which said first portion is separated from said second portion by said slot.

7. A machine as in claim 6 further including a third portion sloping at its lower margin at approximately the same upward inclination as said second portion and sloping at its upper margin at a steeper upward inclination than said second portion.

8. A machine as in claim 7 in which said second portion is separated from said third portion by a second slot, said slots being spaced apart in parallel spaced relation and oriented diagonally and toward the after end of said second portion.

9. In a windrow inverting machine:
    a. a mobile frame supported on ground engaging wheels for forward movement along a windrow of pre-cut field crop material;
    b. reel means on said frame for engaging, elevating and rearwardly moving the windrow in a continuous fore and aft flow relative to said machine;
    c. a windrow deflector wall having an increasingly steep upwardly sloping portion positioned diagonally on said frame to the rear of said reel means to intercept, diagonally deflect and concurrently invert the moving windrow; and,
    d. tine means protruding through a diagonal slot in said deflector wall for engaging and advancing the moving windrow along the diagonal path toward the after end of said deflector wall, the moving windrow emerging from the after end of said deflector wall and gravitating to the ground in inverted attitude.

* * * * *